M. JINCKS.
Improvement in Saws.
No. 124,825.　　　　　　　　　　　　　Patented March 19, 1872.
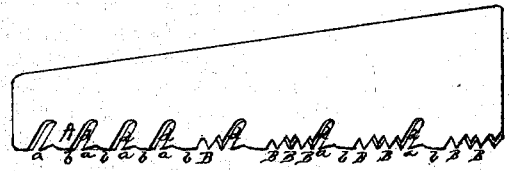
Witnesses
Jno. A. Ellis
J. V. White
Inventor
Melvin Jincks
per.
T. H. Alexander
Atty.

124,825

UNITED STATES PATENT OFFICE.

MELVIN JINCKS, OF WALLACE, NEW YORK.

IMPROVEMENT IN SAWS.

Specification forming part of Letters Patent No. 124,825, dated March 19, 1872.

SPECIFICATION.

*To all whom it may concern:*

Be it known that I, MELVIN JINCKS, of Wallace, in the county of Steuben and State of New York, have invented certain new and useful Improvements in Saws; and I do hereby declare that the following is a full, clear, and exact description thereof, reference being had to the accompanying drawing and to the letters of reference marked thereon which form a part of this specification.

The nature of my invention consists in the construction and arrangement of the teeth of a saw, as will be more fully hereinafter set forth.

In order to enable others skilled in the art to which my invention appertains to make and use the same, I will now proceed to describe its construction and operation, referring to the annexed drawing, which represents a side view of a saw, showing both the cross-cut saw and rip-saw teeth.

A A represent the rip-saw teeth, each of which has a swaged point, $a$, and the gauge-heel $b$, with the throat $d$ between them, as shown at one end of the saw represented in the drawing. The front side of the throat is beveled down from one side to an edge. The object of beveling the throat or recess $d$ is to compel the chips to drop from the saw as fast as it passes through the timber. The back side of the throat being left square, the chips thereby are carried effectually through the saw-cut, and by the bevel on the front of the throat there is no means of holding on to the chips after being carried from the timber. This arrangement allows of deep narrow throat without clogging, which is most desirable and indispensable to success. By introducing two, four, or more cross-cutting bevel-teeth B B between the gauge-heel and throat of the rip-saw teeth, as shown in the other part of the saw represented in the drawing, a combination rip and cross-cut saw is formed, which is very useful for hand-saws, buck-saws, and lumber saws for sawing logs.

Having thus fully described my invention, what I claim as new, and desire to secure by Letters Patent, is—

A saw, provided with teeth A having swaged points $a$, gauge-heels $b$, throat $d$, and teeth B, substantially as and for the purpose set forth.

In testimony that I claim the foregoing as my own I affix my signature in the presence of two witnesses.

MELVIN JINCKS.

Witnesses:
A. R. WARD,
G. W. GUNSOLUS.